(12) United States Patent
Lu (10) Patent No.: US 12,513,367 B2
(45) Date of Patent: Dec. 30, 2025

(54) IMAGE QUALITY ADJUSTING METHOD AND APPARATUS, DEVICE, AND STORAGE MEDIUM

(71) Applicant: SHENZHEN TCL NEW TECHNOLOGY CO., LTD., Guangdong (CN)

(72) Inventor: Mingwei Lu, Guangdong (CN)

(73) Assignee: SHENZHEN TCL NEW TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/710,212

(22) PCT Filed: Nov. 16, 2021

(86) PCT No.: PCT/CN2021/130993
§ 371 (c)(1),
(2) Date: May 15, 2024

(87) PCT Pub. No.: WO2023/087152
PCT Pub. Date: May 25, 2023

(65) Prior Publication Data
US 2025/0097540 A1    Mar. 20, 2025

(51) Int. Cl.
H04N 21/485    (2011.01)
H04N 21/422    (2011.01)
H04N 21/4223   (2011.01)

(52) U.S. Cl.
CPC ... *H04N 21/4854* (2013.01); *H04N 21/42208* (2013.01); *H04N 21/42221* (2013.01); *H04N 21/4223* (2013.01)

(58) Field of Classification Search
CPC ......... H04N 21/4854; H04N 21/42208; H04N 21/42221; H04N 21/4223;
(Continued)

(56) References Cited

U.S. PATENT DOCUMENTS 8,893,164 B1 * 11/2014 Teller ................. G06Q 30/0252
725/12
8,893,185 B2 * 11/2014 Wasilewski ............. H04L 63/08
726/28
(Continued)

FOREIGN PATENT DOCUMENTS

CN    102132555 A    7/2011
CN    104038839 A    9/2014
(Continued)

OTHER PUBLICATIONS

International Search Report in International application No. PCT/CN2021/130993, mailed on Aug. 17, 2022.
(Continued)

*Primary Examiner* — Michael B. Pierorazio
(74) *Attorney, Agent, or Firm* — PV IP PC; Wei Te Chung (57) ABSTRACT

An image quality adjusting method and apparatus, a device, and a storage medium are disclosed. An original image quality parameter value of a target image played by a display device connected to a mobile terminal is determined, a target image quality parameter value is determined according to a preset standard parameter value and the original image quality parameter value, the target image quality parameter value is sent to the display device, and thus the display device automatically adjusts the image quality of the target image according to the target image quality parameter value, without manually adjusting, by a user, an image quality parameter value of a television. The convenience in image quality adjustment of a display device is improved.

15 Claims, 4 Drawing Sheets

(58) Field of Classification Search
CPC ......... H04N 21/43637; H04N 21/4402; H04N 21/44227; H04N 21/4621
See application file for complete search history.

(56) References Cited

U.S. PATENT DOCUMENTS

| | | | |
|---|---|---|---|
| 2002/0085843 A1* | 7/2002 | Mann | E03C 1/057 396/374 |
| 2003/0005454 A1* | 1/2003 | Rodriguez | H04N 21/2385 348/E7.071 |
| 2006/0256133 A1* | 11/2006 | Rosenberg | G06F 3/013 345/619 |
| 2007/0157247 A1* | 7/2007 | Cordray | G06Q 30/02 348/E5.006 |
| 2007/0157260 A1* | 7/2007 | Walker | H04N 21/47214 725/86 |
| 2009/0133051 A1* | 5/2009 | Hildreth | H04N 21/42204 725/28 |
| 2009/0138805 A1* | 5/2009 | Hildreth | H04N 21/4755 715/745 |
| 2010/0058400 A1* | 3/2010 | Nicas | H04N 7/17318 725/74 |
| 2010/0118193 A1* | 5/2010 | Boyden | G09G 5/006 348/554 |
| 2010/0141578 A1* | 6/2010 | Horiuchi | H04N 21/42204 345/158 |
| 2011/0138416 A1* | 6/2011 | Kang | H04N 21/4821 725/39 |
| 2012/0075168 A1* | 3/2012 | Osterhout | G06F 3/017 345/8 |
| 2012/0117103 A1* | 5/2012 | Farrelly | H04L 67/10 707/769 |
| 2012/0192234 A1* | 7/2012 | Britt | H04N 21/4882 725/98 |
| 2012/0324550 A1* | 12/2012 | Wasilewski | H04N 21/4661 726/5 |
| 2013/0014136 A1* | 1/2013 | Bhatia | H04N 21/44218 725/9 |
| 2013/0059601 A1* | 3/2013 | Tran | H04N 21/41407 455/456.1 |
| 2014/0359647 A1* | 12/2014 | Shoemake | H04N 21/6582 725/10 |
| 2015/0026708 A1* | 1/2015 | Ahmed | H04N 21/812 725/12 |
| 2015/0106851 A1* | 4/2015 | Pauli | G06F 3/0386 725/52 |
| 2015/0309687 A1* | 10/2015 | Herigstad | H04N 21/478 715/784 |
| 2015/0373408 A1* | 12/2015 | Yurasits | H04H 60/45 725/12 |
| 2016/0127786 A1* | 5/2016 | Langer | H04N 21/4542 725/28 |
| 2016/0323643 A1* | 11/2016 | Panchaksharaiah | H04N 21/4753 |

FOREIGN PATENT DOCUMENTS

| | | |
|---|---|---|
| CN | 105872843 A | 8/2016 |
| CN | 105979236 A | 9/2016 |
| CN | 111541937 A | 8/2020 |
| JP | 2005346012 A | 12/2005 |
| JP | 2007534046 A | 11/2007 |
| JP | 2010081588 A | 4/2010 |
| JP | 2012253468 A | 12/2012 |
| JP | 2015046135 A | 3/2015 |
| JP | 2017097349 A | 6/2017 |
| JP | 2019149764 A | 9/2019 |
| WO | 2010023966 A1 | 3/2010 |
| WO | 2017110035 A1 | 6/2017 |
| WO | 2020136730 A1 | 7/2020 |

OTHER PUBLICATIONS

Written Opinion of the International Search Authority in International application No. PCT/CN2021/130993, mailed on Aug. 18, 2022.

Japanese Office Action issued in corresponding Japanese Patent Application No. 2024-529286 dated Jun. 24, 2025.

* cited by examiner

IMAGE QUALITY ADJUSTING METHOD AND APPARATUS, DEVICE, AND STORAGE MEDIUM

CROSS REFERENCE TO RELATED APPLICATIONS

This application is a US national phase application based upon an International Application No. PCT/CN2021/130993, filed on Nov. 16, 2021 and entitled "IMAGE QUALITY ADJUSTING METHOD AND APPARATUS, DEVICE, AND STORAGE MEDIUM". The entire disclosures of the above application are incorporated herein by reference.

TECHNICAL FIELD

The present application relates to the technical field of display equipments, and in particular, to an image quality adjusting method, an apparatus, a device, and a storage medium.

BACKGROUND TECHNOLOGY

With the development of science and technology, a lifespan of televisions (TVs) is getting longer and longer. However, after a TV is used for a long time, an image quality of the TV may become poor. Therefore, image quality parameters need to be adjusted.

There are currently two main methods for adjusting TV image quality parameters. One is that TV users manually adjust parameters on TVs, and the other is to ask professional technicians to make adjustments. Because it costs money to ask professional technicians to make adjustments, most users choose to make adjustments manually. However, because many users do not have relevant knowledge about image quality, they set TVs randomly every time, and then see whether the TVs need to be adjusted based on performances of the settings. This process requires users to constantly try to set up, which is more troublesome.

SUMMARY OF INVENTION

Technical Problem

Embodiments of the present application solve the troublesome technical problem that users need to constantly try to set image quality parameters.

Problem Solutions

Technical Solutions

In a first aspect, the present application provides an image quality adjusting method, applied to a mobile terminal, comprising:
  obtaining a target picture played by a display device connected to the mobile terminal;
  determining an original image quality parameter value of the target picture, and determining a target image quality parameter value according to a preset standard parameter value and the original image quality parameter value;
  sending the target image quality parameter value to the display device, such that the display device adjusts an image quality of the target picture according to the target image quality parameter value.

Optionally, determining the target image quality parameter value according to the preset standard parameter value and the original image quality parameter value comprises:
  performing a difference operation on the preset standard parameter value and the original image quality parameter value to obtain the target image quality parameter value.

Optionally, before obtaining the target picture played by the display device connected to the mobile terminal, the image quality adjusting method further comprises:
  obtaining an address of the mobile terminal in a local area network;
  sending a search request to the address;
  receiving a communication address sent by the display device according to the search request, wherein the search request is obtained by the display device by monitoring the address;
  establishing a connection with the display device according to the communication address.

Optionally, the search request is a simple service discovery protocol broadcast packet.

Optionally, establishing the connection with the display device according to the communication address comprises:
  sending a connection request to the display device through the communication address according to a websocket protocol;
  establishing the connection with the display device when receiving a connection consent information sent by the display device according to the connection request.

Optionally, obtaining the target picture played by the display device connected to the mobile terminal comprises:
  sending a playback instruction to the display device through the connection;
  obtaining the target picture played by the display device according to the play instruction.

Optionally, sending the playback instruction to the display device through the connection comprises:
  obtaining a device information of the display device through the connection, and outputting the device information of the display device;
  receiving a confirmation operation entered by a user according to outputting the device information of the display device, and sending an identity verification request to the display device for verification through a preset interface;
  sending a playback instruction to the display device through the connection when the verification is passed.

Optionally, obtaining the target picture played by the display device according to the play instruction further comprises:
  recording a number of frames of an obtained target picture;
  wherein correspondingly, after sending the target image quality parameter value to the display device, such that the display device adjusts an image quality of the target picture according to the target image quality parameter value, the image quality adjusting method further comprises:
  if the number of frames is less than a preset threshold, returning to execution and sending the playback instruction to the display device through the connection.

Optionally, before obtaining the target picture played by the display device connected to the mobile terminal, the image quality adjusting method further comprises:
  performing a Bluetooth device search operation;

using a searched device with a strongest Bluetooth signal strength as the display device, and sending a connection request to the display device;

when receiving a consent connection request sent by the display device according to the connection request, establishing the connection with the display device.

In addition, in order to achieve the above purpose, in a second aspect, the present application further provide an image quality adjusting method, applied to a display device, comprising:

when receiving a playback instruction, playing a target picture such that a mobile terminal connected to the display device obtains the target picture;

receiving the target picture returned by the mobile terminal;

determining an original image quality parameter value of the target picture, and determining a target image quality parameter value according to a preset standard parameter value and the original image quality parameter value;

adjusting an image quality of the target picture according to the target image quality parameter value.

Optionally, adjusting the image quality of the target picture according to the target image quality parameter value comprises:

adding the target image quality parameter value and the preset standard parameter value to obtain a final image quality parameter value;

setting the image quality parameter value in the display device to the final image quality parameter value, and playing the target picture according to the final image quality parameter value.

Optionally, after adjusting the image quality of the target picture according to the target image quality parameter value, the image quality adjusting method further comprises:

playing a content to be played according to an adjusted image quality parameter value.

Optionally, before an operation of when receiving the playback instruction, playing the target picture, the image quality adjusting method further comprises:

monitoring an address of the mobile terminal in a local area network;

when a search request is received through the address, matching a target value in the search request with a target value of the display device;

if the target value in the search request is consistent with the target value of the display device, sending a communication address to the mobile terminal;

when receiving a connection request sent by the mobile terminal through the communication address, establishing a connection with the mobile terminal.

Optionally, when receiving the connection request sent by the mobile terminal through the communication address, establishing the connection with the mobile terminal comprises:

when receiving the connection request sent by the mobile terminal through the communication address according to a websocket protocol, establishing the connection with the mobile terminal.

Optionally, when receiving the playback instruction, playing the target picture comprises:

when receiving the playback instruction sent by the mobile terminal through a connection, searching for the mobile terminal in a legal device queue;

if the mobile terminal is in the legal device queue, playing the target picture.

Optionally, before an operation of when receiving the playback instruction sent by the mobile terminal through the connection, searching for the mobile terminal in the legal device queue, the image quality adjusting method further comprises:

when receiving an identity verification request sent by the mobile terminal through a preset interface, verifying the mobile terminal;

when a verification is passed, adding the mobile terminal to the legal device queue.

In addition, in order to achieve the above purpose, the present application further provide an image quality adjusting apparatus, comprising:

an obtainer configured to obtain a target picture played by a display device;

a determiner configured to determine an original image quality parameter value of the target picture and determine the target image quality parameter value according to a preset standard parameter value and the original image quality parameter value;

a transmitter configured to send the target image quality parameter value to the display device, such that the display device adjusts an image quality of the target picture according to the target image quality parameter value.

In addition, in order to achieve the above purpose, the present application further provide an image quality adjusting apparatus, comprising:

a player configured to play a target picture when receiving a play instruction, such that a mobile terminal obtains the target picture;

a receiver configured to receive the target picture returned by the mobile terminal;

a determiner configured to determine an original image quality parameter value of the target picture and determine a target image quality parameter value according to a preset standard parameter value and the original image quality parameter value;

an adjuster configured to adjust an image quality of the target picture according to the target image quality parameter value.

In addition, in order to achieve the above purpose, the present application further provide a computer device, comprising a processor, a memory, and an image quality adjusting program stored in the memory, wherein when the image quality adjusting program is run by the processor, executing the above image quality adjusting method, or executing the above image quality adjusting method.

In addition, in order to achieve the above purpose, the present application further provide a computer storage medium, wherein an image quality adjusting program is stored on a computer storage medium, and when the image quality adjusting program is run by the processor, executing the above image quality adjusting method, or executing the above image quality adjusting method.

BENEFICIAL EFFECTS OF INVENTION

Beneficial Effects

The present application discloses an image quality adjusting method. First, the mobile terminal obtains the target picture played by the display device connected to the mobile terminal, and then determines the original image quality parameter value of the target picture, and determines the target image quality parameter value according to the preset standard parameter value and the original image quality parameter value. Finally, the target image quality parameter value is sent to the display device, such that the display device can adjust the image quality of the target picture according to the target image quality parameter value. Because the mobile terminal can determine the target image quality parameter value of the target picture played by the display device, and send the target image quality parameter value to the display device, the display device can thus automatically adjust the image quality of the target picture according to the target image quality parameter value, without requiring the user to manually adjust the image quality parameter value, which improves the convenience of adjusting the image quality of the display device.

BRIEF DESCRIPTION OF THE DRAWINGS

Description of Drawings

The technical solutions and beneficial effects of the present application will be apparent through a detailed description of the specific embodiments of the present application in conjunction with the accompanying drawings.

The realization of the purpose, functional features, and advantages of the present application will be further described with reference to the embodiments and the accompanying drawings.

DETAILED DESCRIPTION OF THE PREFERRED EMBODIMENTS

Embodiments of Invention

The realization of the purpose, functional features and advantages of the present application will be further described with reference to the embodiments and the accompanying drawings. Obviously, the described embodiments are only some of the embodiments of the present application, but not all of the embodiments. Based on the embodiments in this application, all other embodiments obtained by those of ordinary skill in the art without creative efforts fall within the scope of protection of this application.

Before the TV leaves the factory, professional technicians will generally set the TV's picture quality parameter values to preset standard parameter values. At this time, the TV's display effect will be better. However, after the TV is used for a long time, although the image quality parameter values set in the TV are still the preset standard parameter values, the display effect will be poor due to the degradation of the image quality. Therefore, at this time, the preset standard parameter values are no longer applicable to the TV, and the image quality parameter values of the TV need to be adjusted.

Currently, there are two main methods for adjusting the picture quality parameter values of TVs. Since it is expensive to hire professional technicians to make adjustments, many TV users adjust the picture quality parameter values of their TVs themselves. However, because many users do not have relevant knowledge about image quality, they set it randomly every time, and then check whether it needs to be adjusted based on the effect of the settings. This process requires users to constantly try settings, which is more troublesome.

In order to solve this technical problem, embodiments of the present application provide an image quality adjusting method. In this method, since the mobile terminal can determine the original image quality parameter value of the target picture played by the display device connected to the mobile terminal, and determine the target image quality parameter value based on the preset standard parameter value and the original image quality parameter value, and send the target image quality parameter value to the display device. The display device can thus automatically adjust the image quality of the target picture according to the target image quality parameter value, eliminating the need for the user to manually adjust the image quality parameter value of the TV, which improves the convenience of adjusting the image quality of the TV. Next, the image quality adjusting method, apparatus, device, etc. provided by the embodiments of the present application will be introduced in detail.

Figure 1:
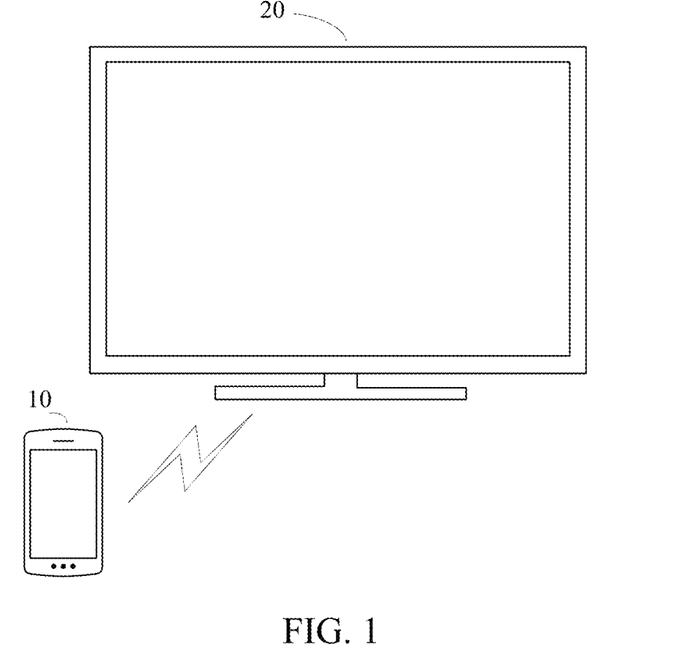
FIG. 1 is a schematic diagram of a scenario provided by the present application.

First, the application scenarios applicable to the embodiments of this application are introduced. As shown in FIG. 1, an exemplary application scenario is shown, and the application scenario may include a mobile terminal 10 and a display device 20.

The mobile terminal 10 can be connected to the display device 20 through wireless connection. Alternatively, the mobile terminal 10 may also be connected to the display device 20 through a switching device. When the mobile terminal 10 is connected to the display device 20, the mobile terminal 10 or the display device 20 may be connected to an external device (such as a keyboard and/or mouse), or may not be connected to an external device. The embodiments of the present application do not limit this.

The mobile terminal 10 in the embodiment of the present application may be a mobile phone, a tablet computer, a wearable device, an augmented reality (AR)/virtual reality (VR) device, a notebook computer, or an ultra-mobile personal computer (Ultra-mobile), personal computer (UMPC), netbook, personal digital assistant (PDA), etc. The display device 20 in the embodiment of the present application may be any display device such as a television, a PC monitor, a tablet computer, or a projector. This embodiment of the present application does not place any restrictions on the type of the mobile terminal 10 and the type of the display device 20.

For example, taking the mobile terminal 10 as a mobile phone and the display device 20 as a television, the mobile terminal 10 can be connected to the display device 20 through a wireless connection. The wireless connection may include a Bluetooth connection or a wireless-fidelity (Wi-Fi) connection. Specifically, the mobile terminal 10 can be connected to the display device 20 through a device interconnection protocol in a local area network (simple service discovery protocol).

Optionally, the mobile terminal 10 can also be connected to the display device 20 through a switching device. For example, the switching device can be plugged into a Universal Serial Bus (USB) interface of a mobile terminal data line, and a type-c interface of the data line is plugged into the mobile terminal. The switching device can also connect to the display device 20 through a switching cable. The switching cable may include any one of a high definition multimedia interface (HDMI) cable, a video graphics array (AGI) cable, a digital visual interface (DVI) cable, etc.

It should be understood that the computing device may be a mobile terminal or a display device.

Based on the application scenario shown in FIG. 1, the image quality adjusting method of this application is described in detail below.

Figure 2:
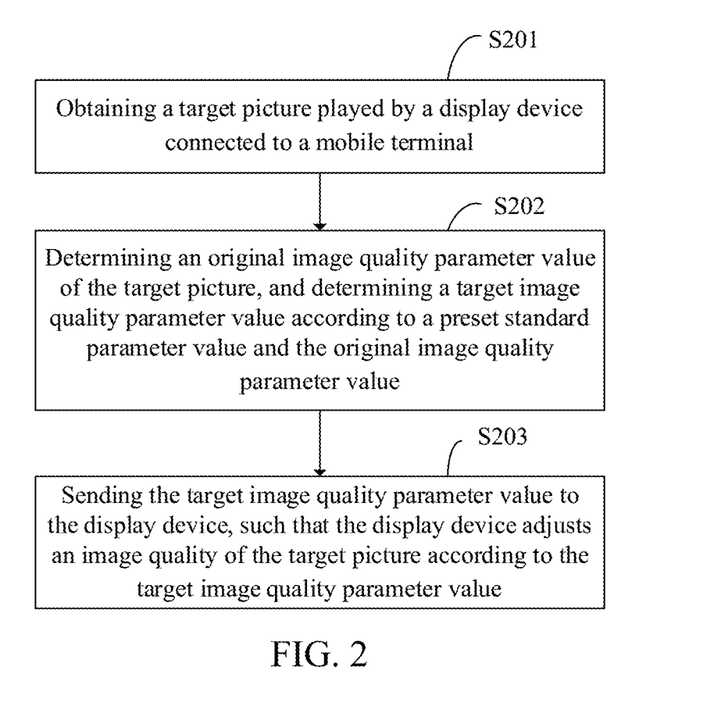
FIG. 2 is a schematic flowchart of an image quality adjusting method in the present application.

Referring to FIG. 2, FIG. 2 is a schematic flowchart of an image quality adjusting method of the present application.

As shown in FIG. 2, an example of an image quality adjusting method provided by this embodiment may specifically include:

S201: obtaining a target picture played by a display device connected to a mobile terminal.

The target picture is a picture preset in the display device. The display device is a television whose picture quality needs to be adjusted by the user.

After the display device plays the target picture, the camera of the mobile terminal may capture the target picture, so that the mobile terminal obtains the target picture. Alternatively, other mobile terminals may also shoot the target picture and then send it to the mobile terminal. The mobile terminal user who takes the target picture can make a choice according to the actual situation, which is not limited in this application.

When the user needs to adjust the image quality of the content played by the display device, the user can operate the display device connected to the mobile terminal so that the display device plays the target picture, and the mobile terminal obtains the target picture.

Alternatively, the user can also operate the mobile terminal, and the mobile terminal sends a playback instruction to the display device through the connection with the display device. The display device then plays the target picture based on the playback instruction, and the mobile terminal obtains the target picture.

In the process of the mobile terminal sending playback instructions to the display device through the connection with the display device, in order to ensure the security of the image quality adjusting process, the user's identity can be verified. Therefore, in some embodiments, the process of sending playback instructions to the display device through the connection may be:

The mobile terminal first obtains the device information of the display device through connection and outputs the device information of the display device. Then, the confirmation operation of the user's input of device information based on the output display device is received, and an identity verification request is sent to the display device for verification through a preset interface. When receiving the authentication request, the display device authenticates the mobile terminal.

The verification method can be set by the user according to the actual situation. For example, in this application, verification code is used, or biometric identification (face recognition or fingerprint recognition) is used for verification. This application is not specifically limited here.

Finally, when the verification is passed, the mobile terminal can send playback instructions to the display device through the connection.

The device information of the display device includes but is not limited to the model, brand and production date of the display device.

When the user needs to adjust the image quality of the content played by the display device, if the mobile terminal is connected to the display device, the mobile terminal can directly obtain the target picture played by the display device. If the mobile terminal has not been connected to the display device, the mobile terminal needs to establish a connection with the display device first.

In one possible implementation, the process of establishing a connection between the mobile terminal and the display device may be:

The mobile terminal obtains its own address in the local area network and sends a search request to the address. The display device obtains the search request by listening to this address.

The search request is a Simple Service Discover Protocol (SSDP) broadcast packet including device search command, search device type, target value, etc.

Then, the display device matches the target value in the search request with its own target value. If the target value in the search request is consistent with its own target value, it sends its own communication address to the mobile terminal.

The mobile terminal thus receives the communication address of the display device. Finally, the mobile terminal establishes a connection with the display device based on the communication address.

It should be understood that the specific process for the mobile terminal to establish a connection with the display device according to the communication address can be:

The mobile terminal sends a connection request to the display device through the communication address based on the websocket protocol. After receiving the connection request sent by the mobile terminal, the display device returns the connection approval information to the mobile terminal. When the mobile terminal receives the connection consent information sent by the display device, it establishes a connection with the display device.

Since the communication efficiency of the websocket protocol is high, the mobile terminal establishing a connection with the display device based on the websocket protocol can improve the interaction efficiency between the mobile terminal and the display device, thereby increasing the rate of adjustment of the image quality of the content played by the display device.

In another possible implementation manner, both the mobile terminal and the display device are devices with Bluetooth functionality. Then the process of establishing a connection between the mobile terminal and the display device can be:

Mobile performs Bluetooth device search operations. Then the searched TV with the strongest Bluetooth signal strength is used as the display device, and a connection request is sent to the display device.

When receiving the connection request, the display device returns connection consent information to the mobile terminal.

When the mobile terminal receives the consent connection request sent by the display device based on the connection request, the mobile terminal establishes a connection with the display device.

In the embodiment of the present application, currently most mobile terminals and TVs are equipped with Bluetooth function. By establishing a Bluetooth connection between the mobile terminal and the display device, the image quality adjusting method in the embodiment of the present application can be directly implemented on the current mobile terminal and display device without adding additional connection modules to the mobile terminal and display device.

S202: determining an original image quality parameter value of the target picture, and determining a target image quality parameter value according to a preset standard parameter value and the original image quality parameter value.

Image quality refers to picture quality. The image quality parameter value includes at least one of clarity, sharpness, lens distortion, dispersion, resolution, color gamut, or white balance.

The preset standard parameter values are the image quality parameter values currently set by the display device. The original image quality parameter value is the image quality parameter value of the content currently played by the display device (due to the degradation of image quality, the image quality parameter value of the content displayed on the TV is inconsistent with the preset standard parameter value).

The preset standard parameter values are different for each type of display device. Therefore, the type of the display device and the preset standard parameter value of the display device can be stored in the mapping table in association with each other. After obtaining the type of the display device, the mobile terminal can determine the preset standard parameter value corresponding to the display device from the mapping table.

Alternatively, the display device can also obtain the preset standard parameter values of the display device from the preset interface.

When the mobile terminal does not find the display device from the mapping table, it can also obtain the preset standard parameter value of the display device from the preset interface. Alternatively, the mobile terminal can also send the display device that is not found to the server, and the server obtains the display device. The preset standard parameter value corresponding to the display device is then returned to the mobile terminal, and the mobile terminal stores it for subsequent use.

As for the method for the mobile terminal to determine the original image quality parameter value of the target picture, the user can choose according to the actual situation. This application is not limited here. For example, when the white balance of the target image needs to be adjusted, the original image quality parameter value can be the grayscale value of the target image, and a white balance algorithm can be selected to determine the original image quality parameter value of the target image.

For another example, when the clarity of the target image needs to be adjusted, the original image quality parameter value can be the resolution of the target image. In this case, the resolution calculation method can be selected to determine the original image quality parameter value of the target image.

In some embodiments, the specific process of determining the target image quality parameter value based on the preset standard parameter value and the original image quality parameter value may be:

The mobile terminal performs a difference operation between the preset standard parameter value and the original image quality parameter value to obtain the target image quality parameter value.

S203: sending the target image quality parameter value to the display device, such that the display device adjusts an image quality of the target picture according to the target image quality parameter value.

After obtaining the target image quality parameter value, the mobile terminal sends the target image quality parameter value to the display device. After receiving the target image quality parameter value, the display device adds the target image quality parameter value and the preset standard parameter value to obtain the final image quality parameter value. Then the image quality parameter value in the display device is set to the final image quality parameter value, and the target picture is played according to the final image quality parameter value.

In order to further improve the accuracy of image quality adjustment, at least two different target pictures can be set, and then the image quality multiple times can be adjusted. Therefore, in other embodiments, when obtaining the target picture played by the display device based on the playback instruction, it also includes: recording the number of frames of the obtained target picture.

Then the target image quality parameter value is sent to the display device on the mobile terminal. After the display device adjusts the image quality of the target picture, if the number of frames is less than the preset threshold, it will automatically return to execution and send playback instructions to the display device through the connection.

Alternatively, if the number of frames is less than the preset threshold, the mobile terminal can display a preset button. If the user is not satisfied with the adjusted image quality, the user can trigger the preset button.

After the user triggers the preset button, the mobile terminal receives the execution instruction, and then returns to execution and sends the playback instruction to the display device through the connection.

It should be noted that the user can set the preset threshold according to the actual situation, for example, in this application. When adjusting the white balance of the target picture, 5 target pictures with different grayscale values can be set, that is, the preset threshold is set to 5. This application is not specifically limited here.

This application discloses an image quality adjusting method. First, the mobile terminal obtains the target picture played by the display device connected to the mobile terminal, then determines the original image quality parameter value of the target picture, and determines the target image quality parameter value based on the preset standard parameter value and the original image quality parameter value. Finally, the target image quality parameter value is sent to the display device, so that the display device can adjust the image quality of the target picture according to the target image quality parameter value. Because the mobile terminal can determine the target image quality parameter value of the target picture played by the display device, and send the target image quality parameter value to the display device. The TV can thus automatically adjust the image quality of the target picture according to the target image quality parameter value, eliminating the need for the user to manually adjust the image quality parameter value, which improves the convenience of adjusting the image quality of the TV.

Figure 3:
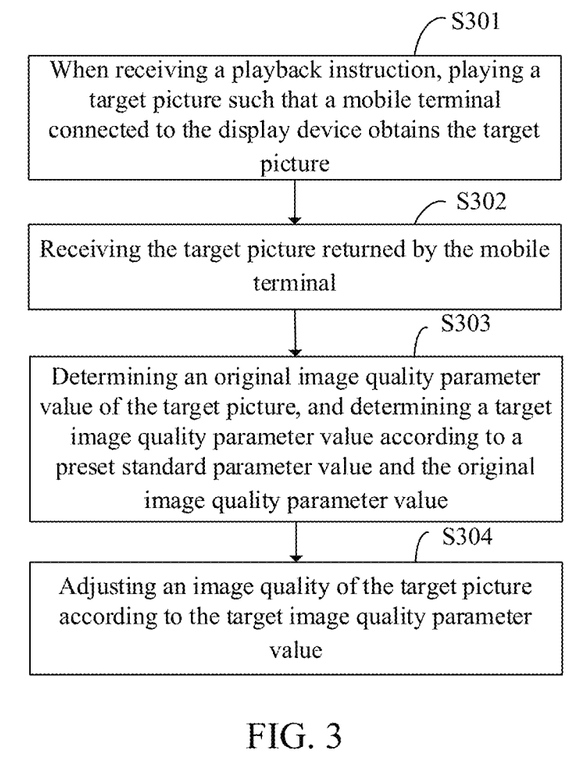
FIG. 3 is a schematic flowchart of another image quality adjusting method in the present application.

In addition, this application also provides another image quality adjusting method, which is applied to a display device. Referring to FIG. 3, the method includes:

S301: when receiving a playback instruction, playing a target picture such that a mobile terminal connected to the display device obtains the target picture.

When the display device receives the playback instruction, it plays the target picture. Thus, the mobile terminal connected to the display device can obtain the target picture.

It should be noted that the user can operate on the interface of the display device, and the display device receives the playback instruction.

Alternatively, the user can also perform operations on the interface of the mobile terminal, so that the mobile terminal receives the image quality adjusting instruction. The mobile terminal then sends a playback instruction to the display device through the connection between the mobile terminal and the display device according to the image quality adjusting instruction, and the display device receives the playback instruction.

In order to ensure the safety of image quality adjustment, in some embodiments, when a play instruction is received, the detailed process of playing the target picture may be:

When receiving the play instruction sent by the mobile terminal through the connection, the display device searches for the mobile terminal in the legal device queue. If the mobile terminal is in the legal device queue, the target picture is played. If the mobile terminal is not in the legal device queue, it may not respond or prompt for authentication operations.

The process of the display device performing authentication operations on the mobile terminal can be:

When the identity verification request sent by the mobile terminal is received through the preset interface, the mobile terminal is verified according to the preset verification method.

Users can set the preset verification method according to the actual situation. For example, in this application, verification code is used, or biometric identification (face recognition or fingerprint recognition) is used for verification. This application is not specifically limited here.

When the verification is passed, the mobile terminal is added to the legal device queue.

In other embodiments, before playing the target picture when the play instruction is received, the method further includes:

The display device monitors the address of the mobile terminal in the local area network. Then when a search request is received at that address, the target value in the search request is matched to the target value of the display device.

If the target value in the search request is consistent with the target value of the display device, the display device sends the communication address to the mobile terminal. If the target value in the search request is inconsistent with the display device's target value, no response may be made.

When the mobile terminal receives the communication address sent by the display device, it sends a connection request to the display device through the communication address. When receiving the connection request sent by the mobile terminal, the display device establishes a connection with the mobile terminal.

The mobile terminal can send a connection request to the display device through the communication address based on the websocket protocol.

Due to the high communication efficiency of the websocket protocol, the display device establishes a connection with the mobile terminal based on the websocket protocol, which can improve the interaction efficiency between the mobile terminal and the display device. Thereby improving the rate of adjusting the image quality of content played by the display device.

It should be noted that the display device can monitor the address of the mobile terminal in the local area network only after receiving the monitoring instruction. For example, when the user needs to adjust the image quality of the display device, the user operates on the display device, and the display device receives the monitoring instruction, and then monitors the address of the mobile terminal in the local area network.

The display device only monitors the address of the mobile terminal in the local area network when it receives the monitoring instruction. This eliminates the need to monitor the address of the mobile terminal in the local area network when there is no need to adjust the image quality of the display device, so that there is no need to occupy resources of the display device when there is no need to adjust the image quality of the display device.

S302: receiving the target picture returned by the mobile terminal.

After playing the target picture, the display device can receive the target picture returned by the mobile terminal through the connection.

S303: determining an original image quality parameter value of the target picture, and determining a target image quality parameter value according to a preset standard parameter value and the original image quality parameter value.

After acquiring the target image, the display device determines the original image quality parameter value of the target image, and determines the target image quality parameter value based on the preset standard parameter value and the original image quality parameter value.

The method of determining the original image quality parameter value of the target image can be selected by the user according to the actual situation. The present application is not limited here. For example, when the white balance of the target image needs to be adjusted, the original image quality parameter value can be the grayscale value of the target image, and a white balance algorithm can be selected to determine the original image quality parameter value of the target image.

For another example, when the clarity of the target image needs to be adjusted, the original image quality parameter value can be the resolution of the target image. In this case, the resolution calculation method can be selected to determine the original image quality parameter value of the target image.

In addition, the specific process of determining the target image quality parameter value based on the preset standard parameter value and the original image quality parameter value can be:

The display device performs a difference operation between the preset standard parameter value and the original image quality parameter value to obtain the target image quality parameter value.

S304: adjusting an image quality of the target picture according to the target image quality parameter value.

When the display device obtains the target image quality parameter value, it can adjust the image quality of the target picture according to the target image quality parameter value.

The process of adjusting the image quality of the target image according to the target image quality parameter value can be:

The display device first adds the target image quality parameter value and the preset standard parameter value to obtain the final image quality parameter value. Then the image quality parameter value in the display device is set to the final image quality parameter value, and the target picture is played according to the final image quality parameter value.

In addition, after the image quality of the target picture is adjusted according to the target image quality parameter value, when the subsequent display device needs to play the content to be played, it may be played according to the adjusted image quality parameter value. That is, the content to be played is played according to the final image quality parameter value.

It should be understood that after acquiring the target picture, the mobile terminal can also first determine the original image quality parameter value of the target picture, and determine the target image quality parameter value based on the original image quality parameter value and the preset standard parameter value. The target image quality parameter value is then sent to the display device, and the display device adjusts the image quality of the target picture according to the target image quality parameter value.

This application discloses an image quality adjustment method. First, when receiving the play instruction, the display device plays the target picture so that the mobile terminal connected to the display device can obtain the target picture. The display device receives the target picture returned by the mobile terminal, and then determines the original image quality parameter value of the target picture, and determines the target image quality parameter value based on the preset standard parameter value and the original image quality parameter value. Finally, the display device can automatically adjust the image quality parameters of the target picture according to the target image quality parameter value. That is, in this application, the display device can automatically adjust the image quality parameter value, without the user having to manually adjust the image quality parameter value, which improves the convenience of adjusting the image quality of the display device.

Figure 4:
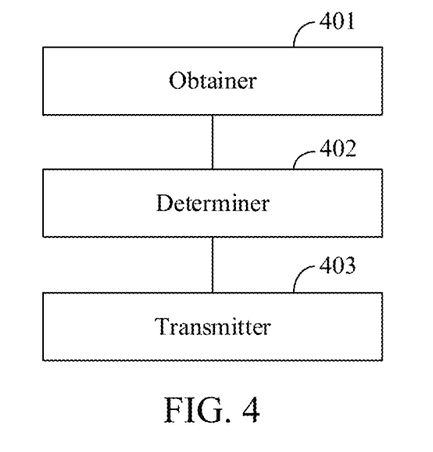
FIG. 4 is a functional module schematic diagram of an image quality adjusting apparatus of the present application.

In addition, this embodiment also provides an image quality adjusting apparatus. Referring to FIG. 4, FIG. 4 is a schematic diagram of functional modules of the image quality adjusting device 40 of the present application.

In this embodiment, the image quality adjusting apparatus is a virtual apparatus and is stored in the mobile terminal to realize all the functions of the image quality adjusting program in the above embodiment:
obtaining a target picture played by a display device connected to the mobile terminal;
determining an original image quality parameter value of the target picture, and determining a target image quality parameter value according to a preset standard parameter value and the original image quality parameter value;
sending the target image quality parameter value to the display device, such that the display device adjusts an image quality of the target picture according to the target image quality parameter value.

Specifically, an image quality adjusting apparatus 40 includes:
an obtainer 401 configured to obtain a target picture played by a display device.
a determiner 402 configured to determine an original image quality parameter value of the target picture and determine the target image quality parameter value according to a preset standard parameter value and the original image quality parameter value.
a transmitter 403 configured to send the target image quality parameter value to the display device, such that the display device adjusts an image quality of the target picture according to the target image quality parameter value.

Optionally, the determiner 402 is further configured to:
perform a difference operation on the preset standard parameter value and the original image quality parameter value to obtain the target image quality parameter value.

Optionally, the image quality adjusting apparatus 40 may also include:
An establisher configured to:
obtain an address of the mobile terminal in a local area network;
send a search request to the address;
receive a communication address sent by the display device according to the search request, wherein the search request is obtained by the display device by monitoring the address;
establish a connection with the display device according to the communication address.

Optionally, the search request is a simple service discovery protocol broadcast packet.

Optionally, the establisher is further configured to:
send a connection request to the display device through the communication address according to a websocket protocol;
establish the connection with the display device when receiving a connection consent information sent by the display device according to the connection request.

Optionally, the obtainer 401 is further configured to:
send a playback instruction to the display device through the connection;
obtain the target picture played by the display device according to the play instruction.

Optionally, the obtainer 401 is further configured to:
obtain a device information of the display device through the connection, and outputting the device information of the display device;
receive a confirmation operation entered by a user according to outputting the device information of the display device, and sending an identity verification request to the display device for verification through a preset interface;
send a playback instruction to the display device through the connection when the verification is passed.

Optionally, the image quality adjusting apparatus further includes:
A recorder configured to:
Record a number of frames of an obtained target picture;
Correspondingly, the image quality adjusting apparatus further includes:
if the number of frames is less than a preset threshold, returning to execution and sending the playback instruction to the display device through the connection.

Optionally, the establisher is configured to:
perform a Bluetooth device search operation;
use a searched device with a strongest Bluetooth signal strength as the display device, and sending a connection request to the display device;
when receiving a consent connection request sent by the display device according to the connection request, establish the connection with the display device.

For the detailed implementation process and corresponding beneficial effects of this embodiment, reference can be made to the above embodiment of the image quality adjustment method, which will not be described again in this application.

Figure 5:
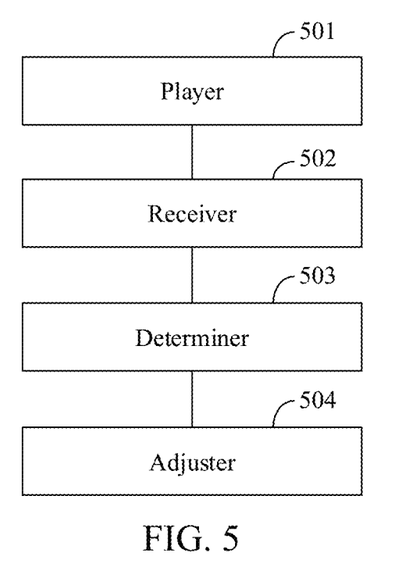
FIG. 5 is a functional module schematic diagram of another image quality adjusting apparatus of the present application.

In addition, this embodiment also provides another image quality adjusting apparatus. Referring to FIG. 5, FIG. 5 is a schematic diagram of functional modules of the image quality adjusting apparatus 50 of the present application.

In this embodiment, an image quality adjusting apparatus 50 is a virtual device stored in the display device to realize all the functions of the image quality adjustment program in the above embodiment:

Play a target picture when receiving a play instruction, such that a mobile terminal obtains the target picture;

Receive the target picture returned by the mobile terminal;

Determine an original image quality parameter value of the target picture and determine a target image quality parameter value according to a preset standard parameter value and the original image quality parameter value;

Adjust an image quality of the target picture according to the target image quality parameter value.

In details, the image quality adjusting apparatus 50 includes:

A player 501 configured to play a target picture when receiving a play instruction, such that a mobile terminal obtains the target picture;

A receiver 502 configured to receive the target picture returned by the mobile terminal;

A determiner 503 configured to determine an original image quality parameter value of the target picture and determine a target image quality parameter value according to a preset standard parameter value and the original image quality parameter value;

An adjuster 504 configured to adjust an image quality of the target picture according to the target image quality parameter value.

Optionally, the adjuster 504 is further configured to:

Perform a difference operation on the preset standard parameter value and the original image quality parameter value to obtain the target image quality parameter value Set the image quality parameter value in the display device to the final image quality parameter value, and play the target picture according to the final image quality parameter value.

Optionally, the player 501 is further configured to:

Play the content to be played according to the adjusted image quality parameter value.

Optionally, the image quality adjusting apparatus may also include:

an establisher configured to:

monitor an address of the mobile terminal in a local area network;

when a search request is received through the address, match a target value in the search request with a target value of the display device;

if the target value in the search request is consistent with the target value of the display device, send a communication address to the mobile terminal;

when receiving a connection request sent by the mobile terminal through the communication address, establish a connection with the mobile terminal.

Optionally, the establisher is further configured to:

when receiving the connection request sent by the mobile terminal through the communication address according to a websocket protocol, establish the connection with the mobile terminal.

Optionally, the player 501 is further configured to:

when receiving the playback instruction sent by the mobile terminal through a connection, search for the mobile terminal in a legal device queue;

if the mobile terminal is in the legal device queue, playing the target picture.

Optionally, the image quality adjusting apparatus may also include:

A verifier module configured to:

when receiving an identity verification request sent by the mobile terminal through a preset interface, verify the mobile terminal;

when a verification is passed, add the mobile terminal to the legal device queue.

For the detailed implementation process and corresponding beneficial effects of this embodiment, reference can be made to the above embodiment of the image quality adjustment method, which will not be described again in this application.

Figure 6:
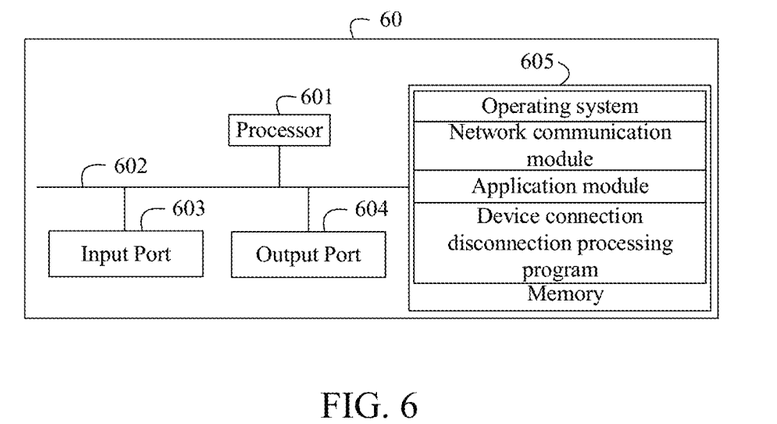
FIG. 6 is a schematic structural diagram of a mobile terminal provided by the present application.

This embodiment of the present application also provides a schematic structural diagram of a mobile terminal, as shown in FIG. 6. In this embodiment of the present application, a mobile terminal 60 may include a processor 601 (such as a central processing unit, CPU), a communication bus 602, an input port 603, an output port 604, and a memory 605. The communication bus 602 is used to implement connection communication between these components. The input port 603 is used for data input. The output port 604 is used for data output. The memory 605 may be a high-speed RAM memory or a stable memory (non-volatile memory), such as a disk memory. The memory 605 may optionally be a storage device independent of the aforementioned processor 601. Those skilled in the art can understand that the hardware structure shown in FIG. 6 does not limit the present application, and may include more or fewer components than shown, or combine certain components, or arrange different components.

Continuing to refer to FIG. 6, the memory 605 as a storage medium in FIG. 6 may include an operating system, a network communication module, an application module, and a device connection disconnection processing program. In FIG. 6, the network communication module is mainly used to connect to the server and communicate with the server. The processor 601 can call the image quality adjusting program stored in the memory 605 and execute the image quality adjusting method provided by the embodiment of the present application.

It should be understood that the mobile terminal shown in FIG. 6 is only an example. The structure illustrated in FIG. 6 does not constitute a specific limitation on the mobile terminal. In other optional embodiments of the present application, the mobile terminal may have more or fewer components than shown in FIG. 6, may combine two or more components, or may have different component configurations. The various components shown in the figures may be implemented in hardware, software, or a combination of hardware and software including one or more signal processing and/or application specific integrated circuits.

Figure 7:
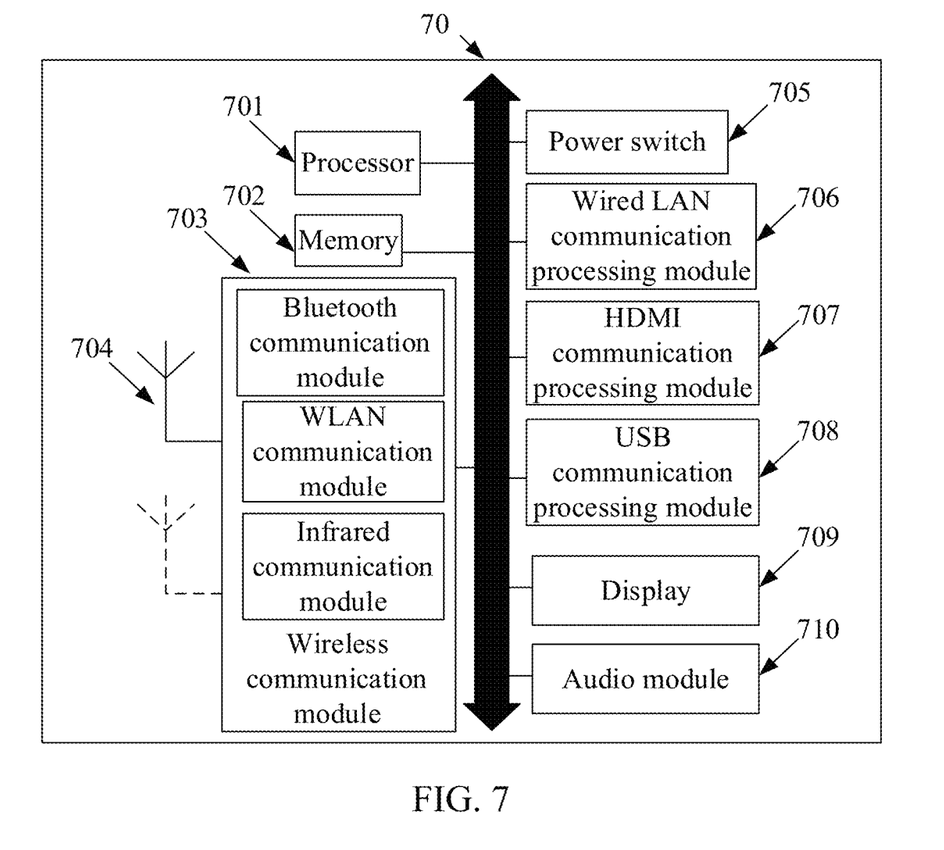
FIG. 7 is a schematic structural diagram of a display device provided by the present application.

An embodiment of the present application also provides a schematic structural diagram of a display device, as shown in FIG. 7.

As shown in FIG. 7, the display device 70 may include: processor 701, memory 702, wireless communication module 703, antenna 704, power switch 705, wired LAN communication processing module 706, HDMI communication processing module 707, USB communication processing module 708, display 709, audio module 710.

The processor 701 can be used to read and execute computer readable instructions. In specific implementation, the processor 701 may mainly include a controller, arithmetic unit, and registers. Among them, the controller is mainly responsible for decoding instructions and issuing control signals for operations corresponding to the instructions. The arithmetic unit is mainly responsible for saving register operands and intermediate operation results temporarily stored during instruction execution. In specific implementation, the hardware architecture of the processor 701 may be an application specific integrated circuit (ASIC) architecture, a MIPS architecture, an ARM architecture, or an NP architecture, etc.

In some embodiments, the processor 701 can be used to parse signals received by the wireless communication module 703 and/or the wired LAN communication processing module 706, such as broadcast detection requests, power-on instructions or remote control code library acquisition requests, etc. The processor 701 can be used to perform corresponding processing operations according to the analysis results, such as generating a detection response, or according to the boot command or lighting the display screen 709 and displaying the homepage interface. Another example is to retrieve the remote control code library according to the remote control code library acquisition request, and so on.

In some embodiments, the processor 701 can also be used to generate signals sent externally by the wireless communication module 703 and/or the wired LAN communication processing module 706, such as audio data, Bluetooth broadcast signals, and beacon signals.

The memory 702 is coupled to the processor 701 for storing various software programs and/or sets of instructions. In specific implementations, the memory 702 may include high-speed random access memory, and may also include non-volatile memory, such as one or more disk storage devices, flash memory devices or other non-volatile solid-state storage devices. The memory 702 can store operating systems, such as uCOS, Vx Works, RTLinux and other embedded operating systems. The memory 702 may also store communications programs that may be used to communicate with a display device, one or more servers, or accessory devices.

The wireless communication module 703 may include one or more of a Bluetooth communication module, a WLAN communication module, and an infrared communication module. Bluetooth communication modules may include classic Bluetooth (BT) modules and Bluetooth Low Energy (BLE) modules. In some embodiments, one or more of the Bluetooth communication module, WLAN communication module, and infrared communication module can monitor signals emitted by other devices (such as mobile terminals), such as detection requests, scanning signals, etc., and can send Response signals, such as detection response, scan response, etc. This allows other devices (such as mobile terminals) to discover the display device, establish wireless communication connections with other devices, and communicate with other devices (such as mobile terminals) through one or more wireless communication technologies such as Bluetooth, WLAN, or infrared. In other embodiments, one or more of the Bluetooth communication module, WLAN communication module, and infrared communication module can also emit signals, such as broadcasting Bluetooth signals and beacon signals, so that other devices (such as mobile terminals) can discover the display device, and establishes wireless communication connections with other devices (such as mobile terminals), and communicates with other devices (such as mobile terminals) through one or more wireless communication technologies in Bluetooth or WLAN. In some embodiments, the wireless communication module 703 may also include a cellular mobile communication module (not shown).

The wireless communication function of the display device can be implemented through the antenna 704, the wireless communication module 703, the modem processor, etc. Antenna 704 may be used to transmit and receive electromagnetic wave signals. Each antenna in the display device can be used to cover a single or multiple communication bands. Different antennas can also be reused to improve antenna utilization. For example: the antenna of the WLAN communication module can be reused as the antenna of the Bluetooth communication module. In other embodiments, antennas may be used in conjunction with tuning switches.

The power switch 705 may be used to control power supply to the display device.

The wired LAN communication processing module 706 can be used to communicate with other devices in the same LAN through the wired LAN, and can also be used to connect to a WAN through the wired LAN and communicate with devices in the WAN.

The HDMI communication processing module 707 may be used to communicate with other devices through an HDMI interface (not shown).

The USB communication processing module 708 may be used to communicate with other devices through a USB interface (not shown).

The display 709 can be used to display images, videos, etc. The display 709 can be a liquid crystal display (LCD), an organic light-emitting diode (OLED) display, an active-matrix organic light emitting diode (AMOLED) display, a flexible light-emitting diode (FLED) display screen, a quantum dot light emitting diode (QLED) display screen, etc.

The audio module 710 is used to convert digital audio information into analog audio signal output, and is also used to convert analog audio input into digital audio signals. The audio module 710 may also be used to encode and decode audio signals. In some embodiments, the audio module 710 may be provided in the processor 701, or some functional modules of the audio module 710 may be provided in the processor 701. The audio module 710 can be used to output audio signals through the audio output interface, so that the display device supports audio playback. The audio module 710 may also be used to receive audio data through an audio input interface.

In some embodiments, the display device may also include a serial interface such as an RS-232 interface. This serial interface can be connected to other devices, such as speakers and other audio external devices, so that the display and audio external devices can cooperate to play audio and video.

It should be understood that the display device shown in FIG. 7 is only an example, and the structure illustrated in FIG. 7 does not constitute a specific limitation on the display device. In other alternative embodiments of the present application, the display device may have more or fewer components than shown in FIG. 7, may combine two or more components, or may have different component configurations. The various components shown in the figures may be implemented in hardware, software, or a combination of hardware and software including one or more signal processing and/or application specific integrated circuits.

In addition, embodiments of the present application also provide a computer storage medium (storage medium for short). The computer storage medium stores an image quality adjusting program. When the image quality adjusting program is run by a processor, the above image quality adjusting method is implemented.

It should be noted that, as used herein, the terms "include", "comprising" or any other variation thereof are intended to cover a non-exclusive inclusion, such that a process, method, article or system that includes a list of elements not only includes those elements, but It also includes other elements not expressly listed or that are inherent to the process, method, article or system. Without further limitation, an element defined by the statement "comprises a . . . " does not exclude the presence of other identical elements in the process, method, article, or system that includes that element.

The above serial numbers of the embodiments of the present application are only for description and do not represent the advantages and disadvantages of the embodiments.

Through the description of the above embodiments, those skilled in the art can clearly understand that the methods of the above embodiments can be implemented by means of software plus the necessary general hardware platform. It can also be done through hardware, but in many cases the former is the better implementation. Based on this understanding, the technical solution of the present application is essentially or the part that contributes to the existing technology can be embodied in the form of a software product. The computer software product is stored in a storage medium (such as ROM/RAM, magnetic disk, optical disk) as described above, and includes a number of instructions to cause a mobile terminal to execute the methods described in various embodiments of the present application.

The above descriptions are only preferred embodiments of the present application, and are not intended to limit the patent scope of the present application. Any equivalent structural or process transformations made using the contents of the description and drawings of this application, or directly or indirectly applied in other related technical fields, are likewise included in the scope of patent protection of this application.

What is claimed is:

1. An image quality adjusting method, applied to a mobile terminal, comprising:
    obtaining a target picture played by a display device connected to the mobile terminal;
    determining an original image quality parameter value of the target picture, and determining a target image quality parameter value according to a preset standard parameter value and the original image quality parameter value;
    sending the target image quality parameter value to the display device, such that the display device adjusts an image quality of the target picture according to the target image quality parameter value;
    wherein before obtaining the target picture played by the display device connected to the mobile terminal, the image quality adjusting method further comprises:
    obtaining an address of the mobile terminal in a local area network;
    sending a search request to the address;
    receiving a communication address sent by the display device according to the search request, wherein the search request is obtained by the display device by monitoring the address;
    establishing a connection with the display device according to the communication address;
    wherein obtaining the target picture played by the display device connected to the mobile terminal comprises:
    sending a playback instruction to the display device through the connection;
    obtaining the target picture played by the display device according to the play instruction;
    wherein sending the playback instruction to the display device through the connection comprises:
    obtaining a device information of the display device through the connection, and outputting the device information of the display device;
    receiving a confirmation operation entered by a user according to outputting the device information of the display device, and sending an identity verification request to the display device for verification through a preset interface;
    sending a playback instruction to the display device through the connection when the verification is passed.

2. The image quality adjusting method according to claim 1, wherein determining the target image quality parameter value according to the preset standard parameter value and the original image quality parameter value comprises:
    performing a difference operation on the preset standard parameter value and the original image quality parameter value to obtain the target image quality parameter value.

3. The image quality adjusting method according to claim 1, wherein the search request is a simple service discovery protocol broadcast packet.

4. The image quality adjusting method according to claim 1, wherein establishing the connection with the display device according to the communication address comprises:
    sending a connection request to the display device through the communication address according to a websocket protocol;
    establishing the connection with the display device when receiving a connection consent information sent by the display device according to the connection request.

5. The image quality adjusting method according to claim 1, wherein obtaining the target picture played by the display device according to the play instruction further comprises:
    recording a number of frames of an obtained target picture;
    wherein correspondingly, after sending the target image quality parameter value to the display device, such that the display device adjusts an image quality of the target picture according to the target image quality parameter value, the image quality adjusting method further comprises:
    if the number of frames is less than a preset threshold, returning to execution and sending the playback instruction to the display device through the connection.

6. The image quality adjusting method according to claim 1, wherein before obtaining the target picture played by the display device connected to the mobile terminal, the image quality adjusting method further comprises:
    performing a Bluetooth device search operation;
    using a searched device with a strongest Bluetooth signal strength as the display device, and sending a connection request to the display device;
    when receiving a consent connection request sent by the display device according to the connection request, establishing a connection with the display device.

7. An image quality adjusting method, applied to a display device, comprising:
    when receiving a playback instruction, playing a target picture such that a mobile terminal connected to the display device obtains the target picture;

receiving the target picture returned by the mobile terminal;

determining an original image quality parameter value of the target picture, and determining a target image quality parameter value according to a preset standard parameter value and the original image quality parameter value;

adjusting an image quality of the target picture according to the target image quality parameter value;

wherein when receiving the playback instruction, playing the target picture comprises:

when receiving the playback instruction sent by the mobile terminal through a connection, searching for the mobile terminal in a legal device queue;

if the mobile terminal is in the legal device queue, playing the target picture.

8. The image quality adjusting method according to claim 7, wherein adjusting the image quality of the target picture according to the target image quality parameter value comprises:

adding the target image quality parameter value and the preset standard parameter value to obtain a final image quality parameter value;

setting the image quality parameter value in the display device to the final image quality parameter value, and playing the target picture according to the final image quality parameter value.

9. The image quality adjusting method according to claim 7, wherein after adjusting the image quality of the target picture according to the target image quality parameter value, the image quality adjusting method further comprises:

playing a content to be played according to an adjusted image quality parameter value.

10. The image quality adjusting method according to claim 7, wherein before an operation of when receiving the playback instruction, playing the target picture, the image quality adjusting method further comprises:

monitoring an address of the mobile terminal in a local area network;

when a search request is received through the address, matching a target value in the search request with a target value of the display device;

if the target value in the search request is consistent with the target value of the display device, sending a communication address to the mobile terminal;

when receiving a connection request sent by the mobile terminal through the communication address, establishing a connection with the mobile terminal.

11. The image quality adjusting method according to claim 10, wherein when receiving the connection request sent by the mobile terminal through the communication address, establishing the connection with the mobile terminal comprises:

when receiving the connection request sent by the mobile terminal through the communication address according to a websocket protocol, establishing the connection with the mobile terminal.

12. The image quality adjusting method according to claim 7, wherein before an operation of when receiving the playback instruction sent by the mobile terminal through the connection, searching for the mobile terminal in the legal device queue, the image quality adjusting method further comprises:

when receiving an identity verification request sent by the mobile terminal through a preset interface, verifying the mobile terminal;

when a verification is passed, adding the mobile terminal to the legal device queue.

13. An image quality adjusting apparatus, comprising:

an obtainer configured to obtain a target picture played by a display device;

a determiner configured to determine an original image quality parameter value of the target picture and determine the target image quality parameter value according to a preset standard parameter value and the original image quality parameter value;

a transmitter configured to send the target image quality parameter value to the display device, such that the display device adjusts an image quality of the target picture according to the target image quality parameter value;

an establisher configured to:

obtain an address of the mobile terminal in a local area network;

send a search request to the address;

receive a communication address sent by the display device according to the search request, wherein the search request is obtained by the display device by monitoring the address;

establish a connection with the display device according to the communication address:

wherein the obtainer is further configured to:

send a playback instruction to the display device through the connection;

obtain the target picture played by the display device according to the play instruction;

wherein the obtainer is further configured to:

obtain a device information of the display device through the connection, and output the device information of the display device;

receive a confirmation operation entered by a user according to outputting the device information of the display device, and sending an identity verification request to the display device for verification through a preset interface;

send a playback instruction to the display device through the connection when the verification is passed.

14. The image quality adjusting apparatus according to claim 13, further comprising:

a player configured to play the target picture when receiving a play instruction, such that a mobile terminal obtains the target picture;

a receiver configured to receive the target picture returned by the mobile terminal;

an adjuster configured to adjust the image quality of the target picture according to the target image quality parameter value.

15. The image quality adjusting apparatus according to claim 13, wherein the determiner is further configured to:

perform a difference operation on the preset standard parameter value and the original image quality parameter value to obtain the target image quality parameter value.

* * * * *